US012676898B2

(12) United States Patent
Kakinada et al.

(10) Patent No.: US 12,676,898 B2
(45) Date of Patent: **\*Jul. 7, 2026**

(54) METHOD AND FRAMEWORK FOR INTERNET OF THINGS NETWORK SECURITY

(71) Applicant: Charter Communications Operating, LLC, St. Louis, MO (US)

(72) Inventors: Umamaheswar Kakinada, Centennial, CO (US); Hossam Hmimy, Aurora, CO (US); Manish Jindal, Lone Tree, CO (US); Satyanarayana Parimi, Cos Cob, CT (US); Patricia Zullo, Indio, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 667 days.

This patent is subject to a terminal disclaimer.

(21) Appl. No.: 17/572,782

(22) Filed: Jan. 11, 2022

(65) Prior Publication Data

US 2022/0131905 A1 Apr. 28, 2022

Related U.S. Application Data

(63) Continuation of application No. 16/897,597, filed on Jun. 10, 2020, now Pat. No. 11,258,830.

(51) Int. Cl.
H04L 9/40 (2022.01)
G16Y 30/10 (2020.01)
(Continued)

(52) U.S. Cl.
CPC ........ H04L 63/205 (2013.01); H04L 41/0894 (2022.05); H04L 43/065 (2013.01);
(Continued)

(58) Field of Classification Search
CPC . H04L 63/205; H04L 41/0893; H04L 43/065; H04L 47/781; H04L 67/12; H04L 67/303; G16Y 30/10
(Continued)

(56) References Cited

U.S. PATENT DOCUMENTS 7,930,403 B2 * 4/2011 Saffre ................... H04L 47/765
709/212
9,565,227 B1 2/2017 Helter et al.
(Continued)

FOREIGN PATENT DOCUMENTS

CN 108965289 A 12/2018
CN 109906637 B 11/2020
(Continued)

OTHER PUBLICATIONS

Caputo, "DVS Archiving and Storage", 2014 (Year: 2014).
(Continued)

*Primary Examiner* — Shin-Hon (Eric) Chen
*Assistant Examiner* — Saad Ahmad Abdullah
(74) *Attorney, Agent, or Firm* — Young Basile Hanlon & MacFarlane, P.C.

(57) ABSTRACT

A method for Internet of Things (IoT) network security includes collecting information for each network device (device), determining a minimum viable resource allocation for each device based on the information, which defines the minimum resources needed by each device to engage the IoT network and handle data, and for each device, distributing minimum viable resource allocations and rules, determining monitoring sets, monitoring using the monitoring set, collecting updated information based partially on the monitoring set, analyzing the updated information to determine trends and insights relative to the devices and the IoT network, updating the monitoring set, minimum viable
(Continued)

PROVIDE IOT NETWORK SECURITY IN ACCORDANCE WITH THE METHOD DESCRIBED IN FIG. 7

8100

DIVIDE THE IOT NETWORK INTO IOT NETWORK SEGMENTS WITH ASSOCIATED IOT NETWORK DEVICES

8200

ESTABLISH SECURITY ASSOCIATIONS AND MUTUAL TRUSTS BETWEEN IOT NETWORK DEVICES WHICH ARE AT INTERFACES BETWEEN TWO IOT NETWORK SEGMENTS

8300

EXCHANGE THE IOT DATA USING THE DISTRIBUTED SET OF RULES AND THE MINIMUM VIABLE RESOURCE ALLOCATIONS UPON SUCCESSFUL SECURITY ASSOCIATION AND COMPLIANCE

8400

IDENTIFY AT LEAST ONE OF IOT NETWORK DEVICES OR IOT DATA HAVING VIOLATIONS AND UNDER THREAT BASED ON UNSUCCESSFUL COMPLIANCE

8500 resource allocation, and rules based on the analyzed updated information, checking compliance with a current minimum viable resource allocation and rules, identifying devices having violations, and performing same on a continuous as it and automatic basis. The method establishes and maintains a chain of custody for data traversing through multiple network segments.

18 Claims, 8 Drawing Sheets

(51) Int. Cl.

| | |
|---|---|
| *H04L 41/0894* | (2022.01) |
| *H04L 43/065* | (2022.01) |
| *H04L 47/78* | (2022.01) |
| *H04L 67/12* | (2022.01) |
| *H04L 67/303* | (2022.01) |

(52) U.S. Cl.
CPC ............ *H04L 47/781* (2013.01); *H04L 67/12* (2013.01); *H04L 67/303* (2013.01); *G16Y 30/10* (2020.01)

(58) Field of Classification Search
USPC .......................................................... 726/1
See application file for complete search history.

(56) References Cited

U.S. PATENT DOCUMENTS

| | | | |
|---|---|---|---|
| 10,104,104 | B1 | 10/2018 | Juels et al. |
| 10,616,934 | B2 | 4/2020 | Talebi Fard et al. |
| 10,797,934 | B1 | 10/2020 | Akman et al. |
| 10,949,939 | B2 * | 3/2021 | Achtermann .......... G06Q 50/22 |
| 10,963,435 | B1 | 3/2021 | McAlister et al. |
| 11,934,525 | B2 * | 3/2024 | Sheth ................... H04L 9/0869 |
| 2007/0136263 | A1 | 6/2007 | Williams |
| 2013/0304903 | A1 | 11/2013 | Mick et al. |
| 2014/0189484 | A1 | 7/2014 | Fountenberry |
| 2014/0280595 | A1 * | 9/2014 | Mani ...................... H04L 67/10 |
| | | | 709/204 |
| 2016/0070611 | A1 * | 3/2016 | Kim .................... G06F 11/0784 |
| | | | 714/37 |
| 2016/0156715 | A1 | 6/2016 | Larouche et al. |
| 2016/0353456 | A1 | 12/2016 | Gilson et al. |
| 2017/0279620 | A1 * | 9/2017 | Kravitz ............... H04L 63/0876 |
| 2018/0123878 | A1 | 5/2018 | Li et al. |
| 2018/0191563 | A1 | 7/2018 | Farmanbar et al. |
| 2018/0219863 | A1 * | 8/2018 | Tran ........................ H04L 63/08 |
| 2018/0241842 | A1 | 8/2018 | Kumar et al. |
| 2019/0053147 | A1 | 2/2019 | Qiao et al. |
| 2019/0182177 | A1 | 6/2019 | Bugenhagen et al. |
| 2019/0207912 | A1 | 7/2019 | Nielson et al. |
| 2019/0223055 | A1 | 7/2019 | Bor Yaliniz et al. |
| 2019/0327149 | A1 * | 10/2019 | Sun ..................... H04L 41/0894 |
| 2019/0379530 | A1 | 12/2019 | Suthar et al. |
| 2020/0006944 | A1 | 1/2020 | Fife et al. |
| 2020/0007584 | A1 * | 1/2020 | Dixit ................... H04L 41/5019 |
| 2020/0374339 | A1 * | 11/2020 | Billore .................. G06F 9/5083 |
| 2021/0014046 | A1 * | 1/2021 | Ivkushkin ............. H04L 9/3239 |
| 2021/0051070 | A1 | 2/2021 | Akman et al. |
| 2021/0232574 | A1 | 7/2021 | Kvochko et al. |

FOREIGN PATENT DOCUMENTS

| | | | |
|---|---|---|---|
| CN | 113127187 A | 7/2021 | |
| DE | 102019000823 A1 * | 9/2019 | ......... H04L 63/0876 |
| EP | 3147786 A1 | 3/2017 | |
| EP | 3220605 A1 | 9/2017 | |
| EP | 3304824 B1 | 12/2019 | |
| WO | 0078057 A1 | 12/2000 | |
| WO | 2017200978 A1 | 11/2017 | |

OTHER PUBLICATIONS

Cognizant, "The Five Essential IoT Requirements and How to Achieve Them", 2019 (Year: 2019).
Haroon et al., "Constraints in the IoT: The World in 2020 and Beyond", 2016 (Year: 2016).
Kobo et al., "A Survey on Software-Defined Wireless Sensor Networks: Challenges and Design Requirements", 2017 (Year: 2017).
Lawinsider, "minimum network requirements", 2021 (Year: 2021).
Mocnej et al., "Decentralised IoT Architecture for Efficent Resources Utilisation", 2018 (Year: 2018).
Rullo et al., "A Game of Things: Strategic Allocation of Security Resources for IoT", 2017 (Year: 2017).
Sethi et al., "Internet of Things: Architecture, Protocols, and Applications", 2017 (Year: 2017).
Srinidhi et al., "Network optimizations in the Internet of Things: a review", 2019 (Year: 2019).
Wikipedia, "system requirements", 2021 (Year: 2021).
Wikipedia, "minimum viable product", 2021 (Year: 2021).
Zahoor et al., "Resource Management in pervasive Internet of Things: a survey", 2018 (Year: 2018).

* cited by examiner

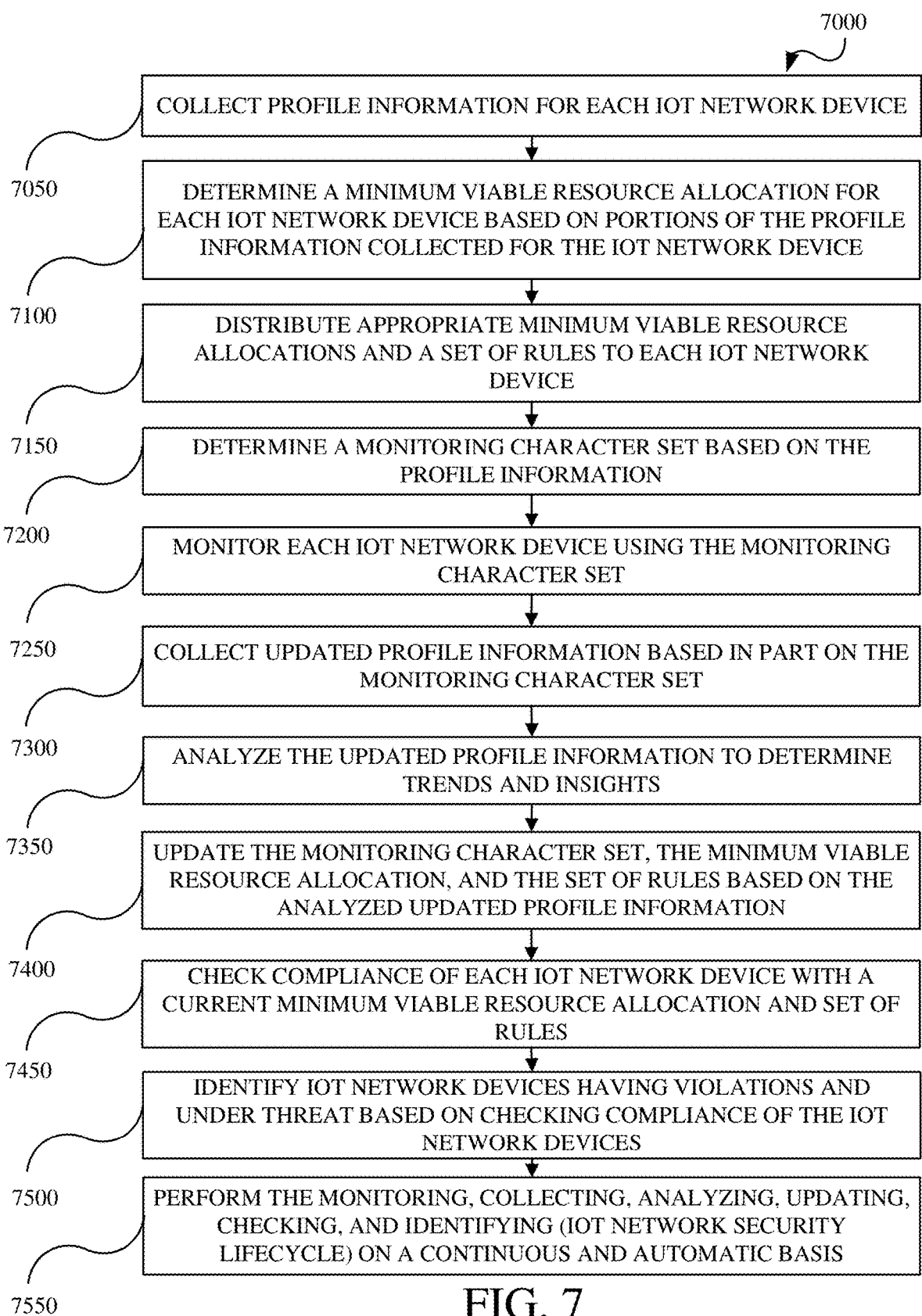

7000

COLLECT PROFILE INFORMATION FOR EACH IOT NETWORK DEVICE

7050

DETERMINE A MINIMUM VIABLE RESOURCE ALLOCATION FOR EACH IOT NETWORK DEVICE BASED ON PORTIONS OF THE PROFILE INFORMATION COLLECTED FOR THE IOT NETWORK DEVICE

7100

DISTRIBUTE APPROPRIATE MINIMUM VIABLE RESOURCE ALLOCATIONS AND A SET OF RULES TO EACH IOT NETWORK DEVICE

7150

DETERMINE A MONITORING CHARACTER SET BASED ON THE PROFILE INFORMATION

7200

MONITOR EACH IOT NETWORK DEVICE USING THE MONITORING CHARACTER SET

7250

COLLECT UPDATED PROFILE INFORMATION BASED IN PART ON THE MONITORING CHARACTER SET

7300

ANALYZE THE UPDATED PROFILE INFORMATION TO DETERMINE TRENDS AND INSIGHTS

7350

UPDATE THE MONITORING CHARACTER SET, THE MINIMUM VIABLE RESOURCE ALLOCATION, AND THE SET OF RULES BASED ON THE ANALYZED UPDATED PROFILE INFORMATION

7400

CHECK COMPLIANCE OF EACH IOT NETWORK DEVICE WITH A CURRENT MINIMUM VIABLE RESOURCE ALLOCATION AND SET OF RULES

7450

IDENTIFY IOT NETWORK DEVICES HAVING VIOLATIONS AND UNDER THREAT BASED ON CHECKING COMPLIANCE OF THE IOT NETWORK DEVICES

7500

PERFORM THE MONITORING, COLLECTING, ANALYZING, UPDATING, CHECKING, AND IDENTIFYING (IOT NETWORK SECURITY LIFECYCLE) ON A CONTINUOUS AND AUTOMATIC BASIS

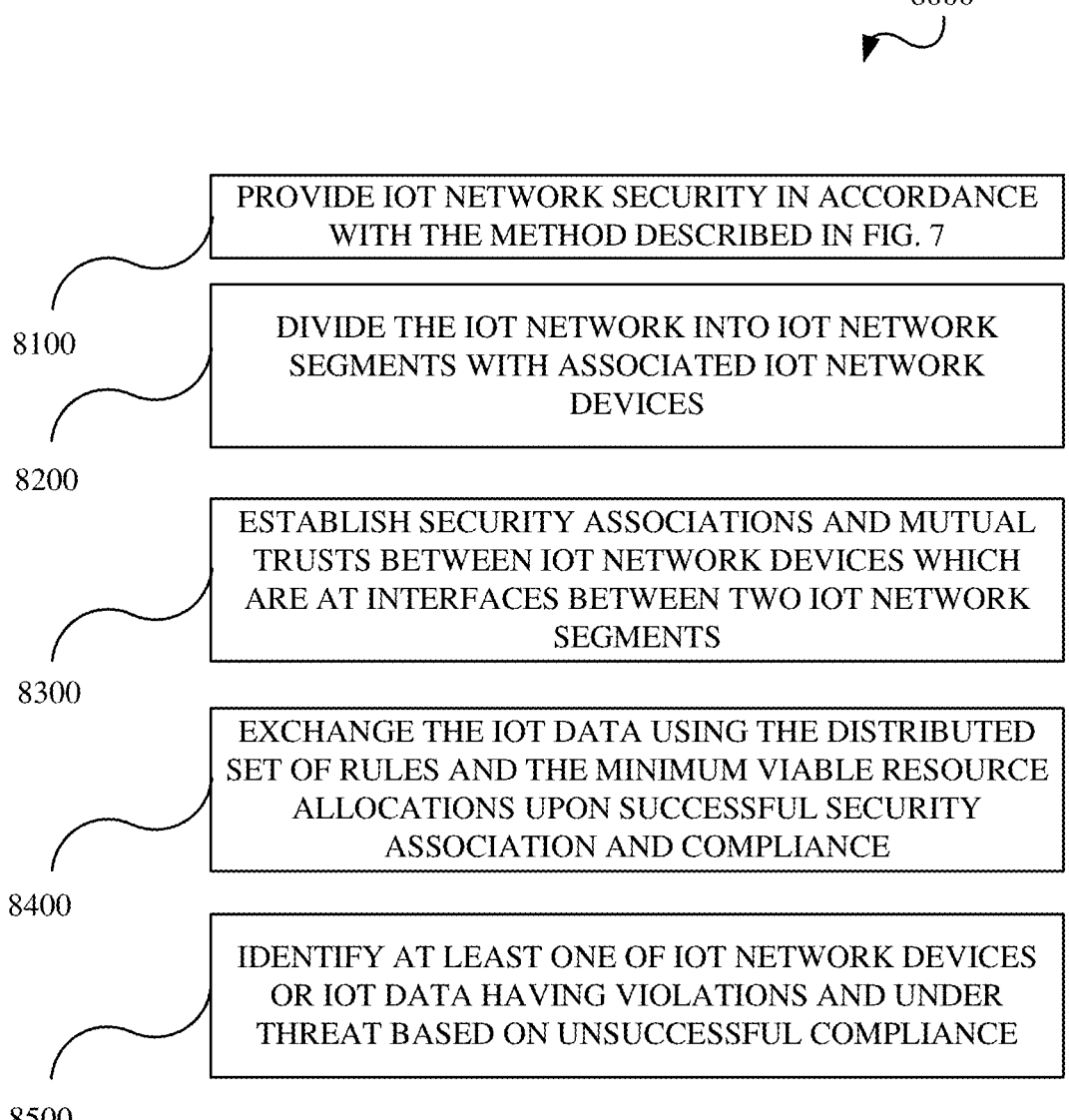

8000

PROVIDE IOT NETWORK SECURITY IN ACCORDANCE WITH THE METHOD DESCRIBED IN FIG. 7

8100

DIVIDE THE IOT NETWORK INTO IOT NETWORK SEGMENTS WITH ASSOCIATED IOT NETWORK DEVICES

8200

ESTABLISH SECURITY ASSOCIATIONS AND MUTUAL TRUSTS BETWEEN IOT NETWORK DEVICES WHICH ARE AT INTERFACES BETWEEN TWO IOT NETWORK SEGMENTS

8300

EXCHANGE THE IOT DATA USING THE DISTRIBUTED SET OF RULES AND THE MINIMUM VIABLE RESOURCE ALLOCATIONS UPON SUCCESSFUL SECURITY ASSOCIATION AND COMPLIANCE

8400

IDENTIFY AT LEAST ONE OF IOT NETWORK DEVICES OR IOT DATA HAVING VIOLATIONS AND UNDER THREAT BASED ON UNSUCCESSFUL COMPLIANCE

METHOD AND FRAMEWORK FOR INTERNET OF THINGS NETWORK SECURITY

CROSS REFERENCE TO RELATED APPLICATION

This application is a continuation of U.S. application Ser. No. 16/897,597 filed Jun. 10, 2020, of which is incorporated herein by reference.

TECHNICAL FIELD

This disclosure relates to data and network security. More specifically, this disclosure relates to a framework for Internet of Things (IoT) networks to provide security for Internet of Things (IoT) devices, IoT network devices, data collected by the IoT devices, and transfer of the data from the IoT devices to an end user application or device as the data traverses through various segments, transformations, and functions with respect to the IoT network.

BACKGROUND

Industrial Control Systems (ICSs) typically existed in silos. Proprietary protocols, proprietary networks, and proprietary technology were used to establish a security perimeter around ICSs and associated entities. Once established, firewalls and intrusion detection and prevention systems served as the foundation for security, and virtual private networks provided a tunnel into the network to access the ICSs and associated entities. The Internet of Things (IoT) is reshaping how applications and ICSs operate and are secured. IoT networks are a collection of IoT devices which communicate with each other. The IoT devices can include, but are not limited to, sensors, actuators, machines, wearables, autonomous vehicles, meters, traffic lights, lighting, security cameras, drones, and like devices which collect and transmit or transfer data. The very nature of IoT networks impacts security implementations.

There are many differentiators between In IoT networks and conventional networks. One type of differentiation is IoT network expansion. The topology of the IoT network is ever expanding and pushing the boundaries of the IoT network. Due to the perpetual addition of functionalities, applications, devices, and equipment, the IoT network is in a continuous state of flux. Any issues with device integrity, security, and robustness can make the IoT network vulnerable. In addition, more and more functionality gets incorporated at the edge, which improves response time and provides localized processing but opens the IoT network to significant vulnerabilities. The expansion of the IoT network together with increased functionality and complexity at the edge of the IoT network brings new security challenges. Security implementations need to deal with exponentially more threat vectors, and an extended threat surface because of the potential vulnerabilities IoT devices can introduce.

Another differentiation is IoT device functionalities. The diverse functionalities and applications in the IoT network need different levels of authorization and access to the data and systems in the access, edge, and core networks. This can lead to usage of less stringent authorization, which in turn can result in exploitation of data and systems with greater sensitivity. In addition, data management policies, sensitivity, and need for accessibility of data to the public often differ significantly across different IoT verticals (especially across different city departments for smart cities). For example, regulatory compliance requirements such as California Consumer Privacy Act (CCPA), General Data Protection and Regulation (GDPR), city/state specific regulations and the like mandate operators and utilities to ensure data security and privacy. Moreover, the IoT networks use shared multi-tenant cloud usage for computation and storage, where the vulnerability of any tenant in any part of the IoT network can impact the entire IoT network. The use of cloud computing in general is attractive in providing deployment flexibility, scalability, and is cost effective. Also, the multi-tenancy aspects of cloud computing enable scaling different applications or verticals of the IoT network independently. However, vulnerability in one segment can be exploited to impact other parts of the IoT network. Tight security by one entity may still lead to issues due to weak security from another entity in the shared cloud. Private and hybrid clouds are also not immune from this problem by virtue of their accessibility needs over the public network.

Critical infrastructure in factories, utilities, cities, and the like are often managed and operated from mobile consoles and bring your own devices (BYOD), which bring additional security challenges. Moreover, IoT devices are relatively inexpensive, have ubiquitous connectivity to the critical network infrastructure, possess enough compute and storage, but are not ruggedized enough from a security perspective. This makes IoT devices attractive for rogue players with malicious intent to potentially harm the network systems, applications and critical infrastructure.

Data and data transfer are further issues. Data flows from IoT devices through networks to public clouds and third-party devices and services, which are out of service provider or network operator control. This is an additional dimension for IoT data security. For instance, data exchanged with water meters by a utility over an operator's network need to be secure and protected for privacy across all the segments during transit and storage. Customer data security and privacy are critical for business success. Data gives insight which drives the value that IoT applications deliver for an enterprise or city. Data breaches undermine brand and city reputation, potentially indicating compliance failures and triggering costly recovery and remediation. Data also can be exploited by hackers or ransomware attackers, which may cause significant financial, reputation, and compliance issues.

As a result of the above differentiators and other similar issues, conventionally used perimeter-based security measures such as firewalls are ineffective for IoT networks.

SUMMARY

Disclosed herein are methods, apparatus, systems, and framework for Internet of Things (IoT) network security.

In implementations, a method for Internet of Things (IoT) network security includes collecting, by a rules node, profile information for each IoT network device in or comprising an IoT network, determining, by the rules node, a minimum viable resource allocation for each IoT network device based on portions of the collected profile information, wherein the minimum viable resource allocation defines for each IoT network device minimum resources needed to engage the IoT network and handle IoT data collected by IoT devices on the IoT network, distributing, by the rules node, an appropriate minimum viable resource allocation and a set of rules to each IoT network device, determining, by the rules node, a monitoring character set based on the collected profile information, monitoring, by the rules node, each IoT network device using the monitoring character set, collecting, by the rules node, updated profile information based in part on the monitoring character set, analyzing, by the rules node, the updated profile information to determine at least trends and insights with respect to the IoT network devices and the IoT network, updating, by the rules node, each monitoring character set, each minimum viable resource allocation, and each set of rules based on the analyzed updated profile information for each of the IoT network devices, checking, by the rules node, compliance of each IoT network device with a current minimum viable resource allocation and current set of rules for the IoT network device, identifying, by the rules node, IoT network devices having violations and under threat based on checking compliance of the IoT network devices, and performing, by the rules node, the monitoring, the collecting of the updated profile information, the analyzing, the updating, the checking, and the identifying on a continuous and automatic basis.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 7 is a flowchart of an example method for IoT network security in accordance with embodiments of this disclosure.

FIG. 8 is a flowchart of an example method for transferring data over an IoT network in accordance with embodiments of this disclosure.

DETAILED DESCRIPTION

Figure 1:
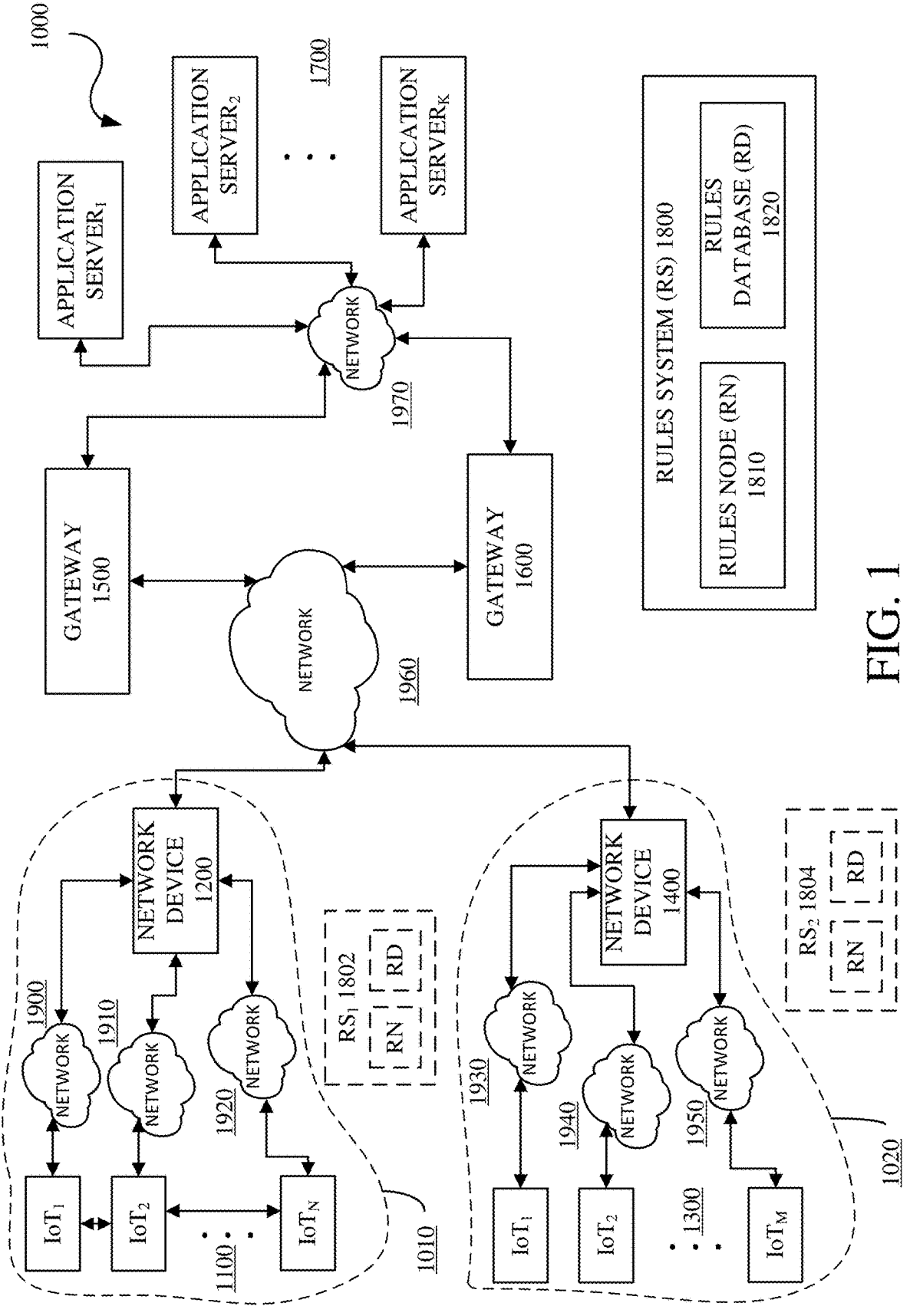
FIG. 1 is a diagram of an example Internet of Things (IoT) network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and framework for Internet of Things (IoT) network security. In an implementation, an IoT network security framework includes gathering or collecting profile information about each entity in the IoT network including IoT devices, edge network devices, access network devices, core network devices, application devices or servers, and the like (collectively "IoT network devices"). A minimum viable resource allocation, minimum viable access, or minimum viable connectivity (collectively "minimum viable resource allocation") is determined for each IoT network device based in part on the profile information. The minimum viable resource allocation can be determined based on connectivity, bandwidth, amount of transmitted data, frequency of transmission, authorization to connect to various IoT network devices and network functions, level of access to data by an IoT network device, time when access to data is permitted for an IoT network device, and location where access to data is permitted by an IoT network device, which are part of the profile information. The minimum viable resource allocation defines the resources needed for an IoT device to engage with the IoT network and access data such as IoT data. Compliance with and enforcement of the minimum viable resource allocation can provide insights into the state of the IoT network and identify anomalies in the IoT network, all of which can be indicated on a display, dashboard, or like system or device.

In implementations, the IoT network security framework includes an IoT network security life cycle where each IoT network device is continuously monitored through an automated process to gather IoT network device data and analyze the IoT network device data to discern insights and identify anomalies with respect to the minimum viable resource allocation for the IoT network device and policies or rules (collectively "rules") including, but not limited to, security rules, transmission rules, access rules, authorization rules, time rules, location rules, and the like. A rule node or policy engine can update the minimum viable resource allocation and the rules based on gathered insights, observed trends in the IoT network device data, and operator input. The rule node updates the IoT network devices based on the updated minimum viable resource allocation and rules in a continuous life cycle process.

In implementations, transfer or transmission of data collected by IoT devices ("IoT data") can be performed reliably and securely by establishing a chain of custody at an interface between different segments. The rules node can distribute a security association and the minimum viable resource allocation to each of the IoT network devices involved at the interface to establish the chain of custody. The rules node can also distribute a security association and the minimum viable resource allocation to the IoT devices and respective application servers or end-user devices to establish end-to-end data transmission security.

FIG. 1 is a diagram of an example IoT network $1000$ in accordance with some embodiments of this disclosure. The IoT network $1000$ includes IoT devices $IoT_1, IoT_2, \ldots, IoT_N$ $1100$, network device $1200$, $IoT_1, IoT_2, \ldots, IoT_M$ $1300$, network device $1400$, gateway $1500$, gateway $1600$, application server $(AS_1), AS_2, \ldots, AS_K$ $1700$, and a rules system $(RS)$ $1800$. The IoT devices $IoT_1, IoT_2, \ldots, IoT_N$ $1100$, the network device $1200$, the $IoT_1, IoT_2, \ldots, IoT_M$ $1300$, the network device $1400$, the gateway $1500$, the gateway $1600$, the $AS_1, AS_2, \ldots, AS_K$ $1700$, and the rules system $(RS)$ $1800$ can be connected to or be in communication with (collectively "connected to") each other using network $1900, 1910$, $1920, 1930, 1940, 1950, 1960$ and $1970$, as applicable and appropriate. In implementations, the IoT network $1000$ the RS $1800$ can include sub-$RS_1$ $1802$, sub-$RS_2$ $1804$, and other sub-RS' which can be local to respective sub-IoT network $1010$, respective sub-IoT network $1020$, and like sub-IoT networks. The IoT network $1000$ and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The networks $1900, 1910, 1920, 1930, 1940, 1950, 1960$ and $1970$ can be, but is not limited to, the Internet, an intranet, a low power wide area network (LPWAN), a local area network (LAN), a wide area network (WAN), a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof.

The IoT devices $IoT_1, IoT_2, \ldots, IoT_N$ $1100$ and the $IoT_1, IoT_2, \ldots, IoT_M$ $1300$ can be, but are not limited to, sensors, actuators, machines, wearables, autonomous vehicles, meters, traffic lights, lighting, security cameras, drones, and like devices which collect and transmit or transfer IoT data to $AS_1, AS_2, \ldots, AS_K$ $1700$ via the network device $1200$, the network device $1400$, the gateway $1500$, the gateway $1600$, and the networks $1900, 1910, 1920, 1930, 1940, 1950$, 1960 and 1970 using the minimum viable resource allocation and rules specified and enforced by the RS 1800 as described herein.

The network device 1200, the network device 1400, the gateway 1500, and the gateway 1600 can be, but is not limited to, routers, gateway devices, edge network devices, access network devices, core network devices, and like devices which provide connectivity including Internet connectivity, wired connectivity, wireless connectivity, and combinations thereof. The network device 1200, the network device 1400, the gateway 1500, and the gateway 1600 can receive rules, security authorization, transmission, communication and security protocols, minimum viable resource allocation, and the like.

The RS 1800 can include a policy engine or rules node (RN) 1810 and a rules database (RD) 1820. The RN 1810 can be a computing platform which continuously monitors and collects device data or information from each of the $IoT_1$, $IoT_2$, . . . , $IoT_N$ 1100, network device 1200, $IoT_1$, $IoT_2$, . . . , $IoT_M$ 1300, network device 1400, gateway 1500, and gateway 1600 via the networks 1900, 1910, 1920, 1930, 1940, 1950, 1960 and 1970. As described herein, the RN 1810 can determine a minimum viable resource allocation for each of the $IoT_1$, $IoT_2$, . . . , $IoT_N$ 1100, network device 1200, $IoT_1$, $IoT_2$, . . . , $IoT_M$ 1300, network device 1400, gateway 1500, and gateway 1600. The RN 1810 can store the minimum viable resource allocations, rules, device profile, and other information in the RD 1820. The RN 1810 can distribute the appropriate minimum viable resource allocation, rules, and other information to each IoT network device in the IoT network 1000 to enable chain of custody between IoT network devices in different segments and to establish end-to-end security between the $IoT_1$, $IoT_2$, . . . , $IoT_N$ 1100, the $IoT_1$, $IoT_2$, . . . , $IoT_M$ 1300, and the $AS_1$, $AS_2$, . . . , $AS_K$ 1700. In implementations, the sub-$RS_1$ 1802 and the sub-$RS_2$ 1804 can similarly distribute to IoT network devices within respective IoT networks.

The $AS_1$, $AS_2$, . . . , $AS_K$ 1700 can be, but is not limited to, computing devices, computing platforms, smart monitors, smartphones, computers, desktop computers, handheld computers, personal media devices, notebooks, notepads, phablets, servers, and the like which use the IoT data from each IoT device to monitor, analyze, or otherwise process the IoT data to provide feedback to an entity, evaluate an entity, or otherwise analyze an entity from which or for which the IoT device is collecting the IoT data.

Figure 2:
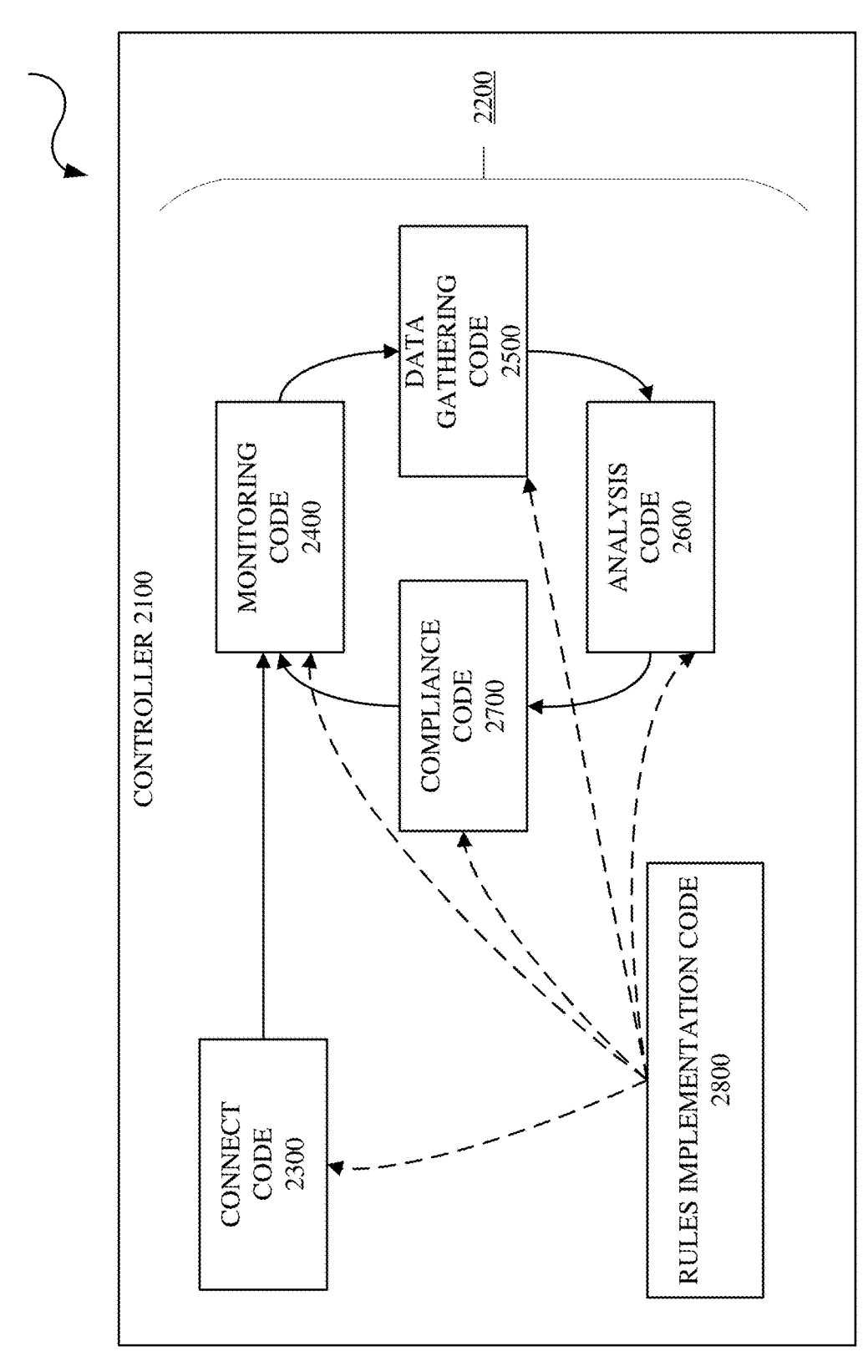
FIG. 2 is a diagram of an example rules node for IoT network security in accordance with embodiments of this disclosure.

FIG. 2 is a diagram of an example rules node 2000 for IoT network security in accordance with embodiments of this disclosure. The rules node 2000 includes a controller 2100 which implements an IoT network security lifecycle 2200. The IoT network security lifecycle 2200 cycles between a connect code 2300, a monitoring code 2400, a data gathering code 2500, an analysis code 2600, and a compliance code 2700 and implements and distributes rules using a rules implementation code 2800. The rules node 2000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The controller 2100 can be a computing device, computing platform, or the like which executes the IoT network security lifecycle 2200, the connect code 2300, the monitoring code 2400, the data gathering code 2500, the analysis code 2600, the compliance code 2700, and the rules implementation code 2800. The controller 2100 automatically and continuously assimilates trends and insights in IoT data, device data, and IoT network state by performing analytics using artificial intelligence and machine learning techniques and algorithms. The minimum viable resource allocation and rules can be formulated and updated based on the determined insights. The updated minimum viable resource allocation and rules are distributed or disseminated to the components in the IoT network, such as IoT network 1000, as appropriate.

The controller 2100 executes the connect code 2300 to determine a minimum viable resource allocation for each IoT network device in an IoT network based on connectivity, IoT device characteristics including, for example, IoT device resource needs and criticality of IoT network device, network component characteristics, availability of network resources, projected availability of network resources, potential demand from other IoT network devices and functions, relative priority and criticality of various functions, time aspects including, for example, time of day, seasonal, event based, special occasions, and the like, location aspects, including, for example, location from where the request is made such as a control center, a law enforcement center, a public utility, or a hospital, where requests from the control center can have higher priority over an edge IoT network device, bandwidth, amount of transmitted data, frequency of transmission, authorization to connect, and access to data requirements for a particular IoT network device. The diversity and volume of IoT use cases are numerous. The number of associated IoT devices and network components are equally large. Consequently, the connectivity needs of the IoT devices and network components are exponentially complex and diverse. This diversity increases the threat surface area, variety of threat vectors, and vulnerabilities. To mitigate this risk a strong connectivity rule in the form of the minimum viable resource allocation is devised and enforced. The minimum viable resource allocation or connectivity rule is customizable based on the above requirements and can be arrived at after a thorough analysis of various components in the IoT network and building an enforcement framework based on or around the minimum viable resource allocation.

The controller 2100 executes the monitoring code 2400 to devise a set of characteristics to monitor for each IoT network device based on an IoT network device profile. The diversity of devices and network functions in an IoT network have different capabilities and consequently different metrics need to be gauged to monitor the IoT network device capabilities. The monitoring code 2400 needs to consider the profile for each IoT network device and formulate a character or feature set to monitor for the IoT network device. The profile information for the IoT network device can include, but is not limited to, the information described herein to determine the minimum viable resource allocation, whether the IoT network device is an IoT device, edge device, core device, or access device, and like information. The character or feature set can include one or more aspects of the profile information. The feature set is adapted based on evolving conditions in the IoT network. Some of these may be conditional on meeting certain thresholds in different areas. Continuous monitoring of the different aspects of the network such as traffic patterns, directions of data flow, or any norm breaking trends in data or traffic can indicate and an identify an existence of potential security threats. Moreover, the monitoring code 2400 can leverage techniques to detect anomalous behavior at the network level, application level, and IoT network device level to, for example, reveal Distributed Denial of Service (DDoS) and other attacks.

Changes in behavior at the application and device level can initiate alerts. The anomalies and threats can be indicated by using displays, generating alerts, audible devices, combinations thereof and the like.

The controller 2100 executes the data gathering code 2500 to gather the device data representative of the characteristics determined by execution of the monitoring code.

The controller 2100 executes the analysis code 2600 to analyze the data gathered from the above mentioned continuous monitoring of the IoT network. As noted, the IoT network is diverse in topology and in its constituent IoT network devices. The security issues often cannot be detected or identified by looking at the snapshot of the IoT network at any given time in isolation. The analysis shall comprise of, not only an analysis of individual snapshots of the IoT network, but also correlation of data points from different parts of the IoT network and across different time periods to identify emerging trends and discern insights. The insights thus derived may lead to addition of new rules or policies or updating existing rules or policies.

The controller 2100 executes the compliance code 2700 to enforce the minimum viable resource allocation and rules. This is a gating function, which ensures all IoT network devices in the IoT network adhere to respective policies and rules. For example, the policies and rules can include, but is not limited to, the minimum viable resource allocation, security, authorization, access, quality of service (QoS), and the like. These rules and policies need to be strictly enforced. The compliance code 2700 can ensure that IoT network devices, which may or may not have tempered with, do not exceed the rules set in place by the rules node 2000. The controller 2100 updates the rules after analysis of the impact of the proposed change(s) across the IoT network based on available data and/or operator input. Automation of policy adaptation and enforcement ensures continued compliance and building resiliency in the network security lifecycle 2200. Automation also helps recognize and address shifting trends in the network in a timely manner.

The controller 2100 executes the rules implementation code 2800 to implement the rules and distribute the minimum viable resource allocation to IoT network devices.

The IoT network security lifecycle 2200 is a continuous improvement cycle to identify potential threats and fine tune rules to adapt to perceived and emerging threat vectors based on insights gathered from analysis and correlation of various data points. The accumulation of data and analytics and correlation of different data points across time and different parts of IoT network can provide insights about the IoT network and applications in their current state as well as emerging trends. These insights can be used to mitigate current threats by planning and addressing for the emerging threats before materialization. This process of keeping the security policies in sync with current and emerging needs of the network weeds out the stale aspects of the policies and keeps it fresh and current. The IoT network is more robust and can be more efficient by eliminating any redundancies. The continuous improvement process mitigates security threats of the IoT network, constituent devices, supported applications, and enables realization of the Vs (volume, velocity, variety, veracity and value) of IoT data generated and processed. The controller 2100 can be continuously updated based on the insights.

As described herein, the IoT network can include a diversity of IoT devices and applications which are ever evolving and generates an enormous amount of IoT data. Security policies, framework, and measures need to adapt to this diversity in devices and applications. In implementations, the IoT network can be divided into segments. The rules system or rules node can automatically and continuously enforce and manage the IoT data and devices, and migration of data across different segments and/or components both external and internal to the IoT network. Each segment and the IoT network devices in that segment can have clearly delineated responsibilities and expectations, including but not limited to, as to how to the IoT data enters the segment, gets processed, and how the IoT data leaves the segment, which can be referred to as security rules or policies ("security rules"). The IoT data is secure while it traverses through the IoT network across the different IoT network devices in each of the segments. In implementations, micro-segments can be created to increase more granular enforcement of security rules.

A chain of custody is established for the IoT data generated from the point of origin until the IoT data is processed, transmitted, stored, or the like at the end-user destination or application. Any two IoT network devices exchanging data shall undergo a security association and confirm minimum viable resource allocations including access and authorization as driven by the security policy. Each IoT network device shall have no more visibility and authorization than absolutely necessary to perform its function. The IoT data is similarly situated with respect to visibility and use. This enables provision of end-to-end secure IoT data transmission between an IoT device and an application and establishes chain-of-custody between different segments during the IoT data transmission. Moreover, ciphering and integrity protection can be used to secure the IoT data. As before, artificial intelligence and machine learning techniques can be used to correlate different metrics in the IoT network to detect and mitigate any suspicious activity. The IoT network or IoT network devices can isolate and quarantine the impacted applications, IoT network devices, and segments of the IoT network at the point of infection. In implementations, blockchain techniques can be used based on the sensitivity of the IoT data and availability of bandwidth.

Figure 3:
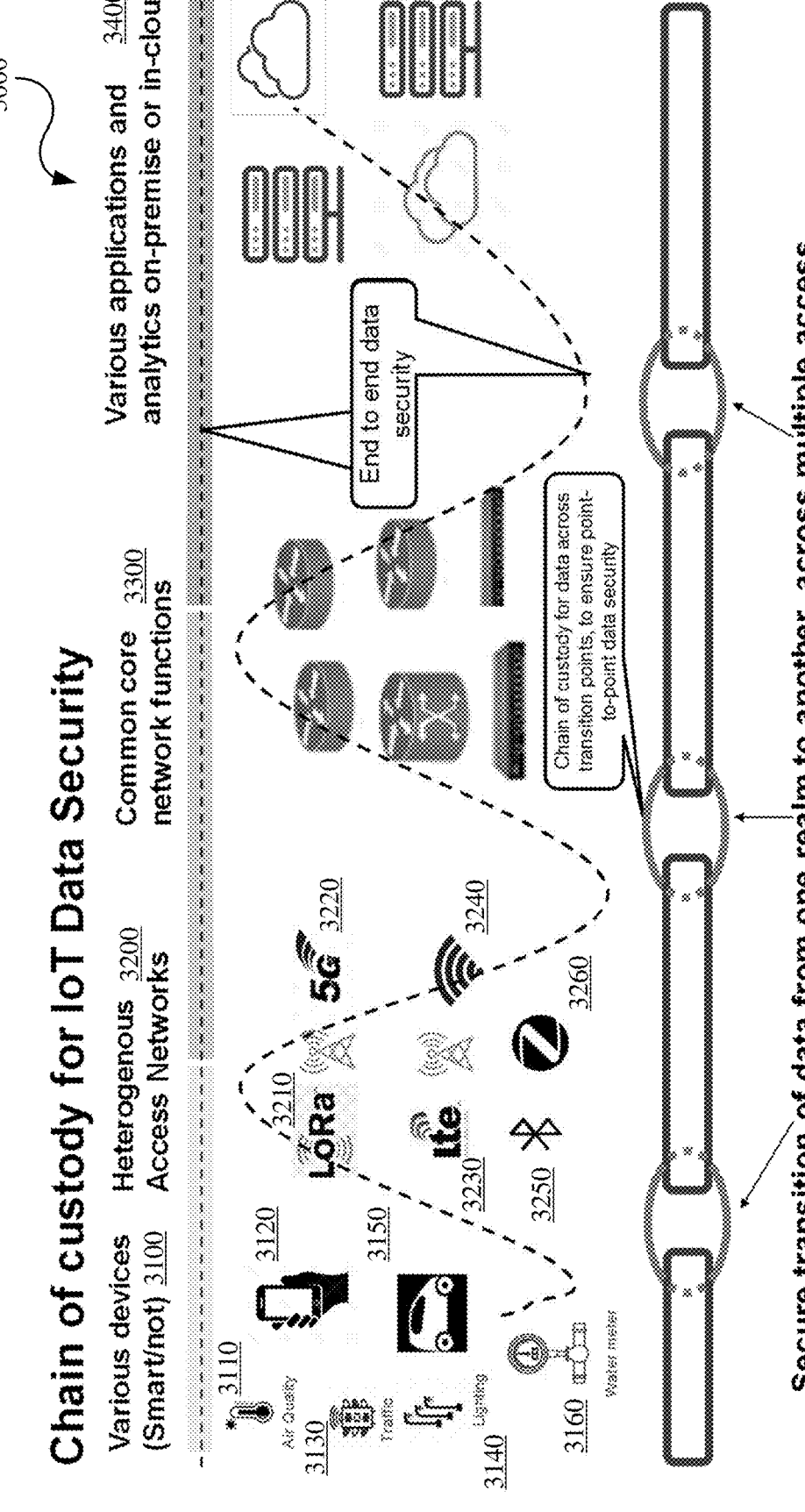
FIG. 3 is a diagram of an example IoT network in accordance with embodiments of this disclosure.

FIG. 3 is a diagram of an example IoT network 3000 in accordance with embodiments of this disclosure. The IoT network 3000 can include an IoT device segment 3100, an access network segment 3200, a core network segment 3300, and application segment 3400. In implementations, the IoT network 3000 can include various application specific network segments which may evolve to address emerging needs. The IoT network 3000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The IoT device segment 3100 can include, but is not limited to, air quality sensors 3110, mobile devices 3120, traffic lights 3130, lighting sensors 3140, vehicles 3150 including autonomous vehicles, water meters 3160, and the like IoT devices. Each of the IoT devices collects IoT data which is transmitted or transferred over the IoT network 3000 to the application segment 3400. The access network segment 3200 can include, but is not limited to, Long Range (LoRa™) access networks 3210, 5G access networks 3220, Long-Term Evolution (LTE) networks 3230, WiFi® access networks 3240, BlueTooth® access networks 3250, Zigbee access networks, and like access networks. The core network segment 3300 can include, but is not limited to, secure gateway servers, public data network gateways, and the like.

The application segment 3400 can include, but is not limited to, application servers, cloud-based applications, onsite applications, and the like. In implementations, each segment can use same or different service providers.

Operatively, the policy engine determines security association parameters and minimum viable resource allocations including authorization and access for each segment and associated IoT network devices and IoT data. In implementations, the security association parameters can include, but is not limited to, transmission protocols, security keys, data security, QoS needs, sensitivity of the IoT network device, sensitivity of data, type of data, and other like parameters. The policy engine distributes the security association parameters and minimum viable resource allocations to each IoT network device in each segment which is at an interface between two segments. The interfacing IoT network devices can establish a security association and mutual trust by challenging and confirming the security association parameters. Successful challenge and confirmation establishes a chain of custody for the IoT data as between the two IoT network devices. The minimum viable resource allocations can be used to check compliance of the IoT devices and other IoT network devices with respect to the IoT data being exchanged. Violations of the security association or minimum viable resource allocation can be identified at any point in the IoT network using the techniques described.

Figure 4:
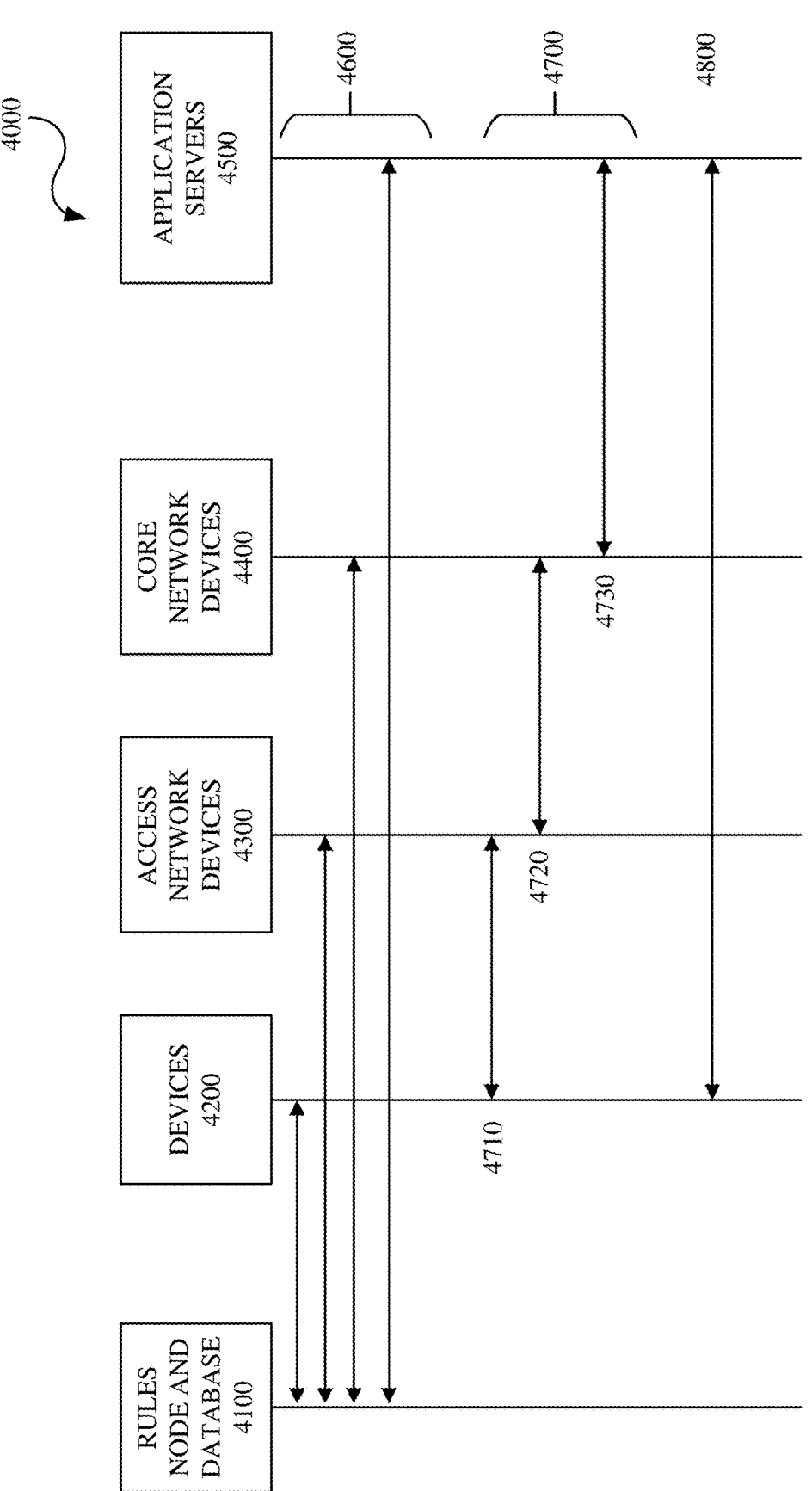
FIG. 4 is a diagram of an example flow sequence for IoT network security in accordance with embodiments of this disclosure.

FIG. 4 is a diagram of an example flow sequence 4000 for IoT network security in accordance with embodiments of this disclosure. The flow sequence 4000 can be implemented using, for example, a rules node and database 4100, devices 4200 which can include IoT devices for example, access network devices 4300, core network devices 4400, and application servers 4500. The rules node and database 4100 distributes rules and policies to the devices 4200, the access network devices 4300, the core network devices 4400, and the application servers 4500 and enforces the same to establish a chain of custody between the IoT network devices and end-to-end secure IoT data transmission between the devices 4200 and the application servers 4500 (4600). The rules and policies can include, but is not limited to, minimum viable resource allocation, security mechanisms and protocols, communication mechanisms and protocols, authentication mechanisms and protocols including authentication keys, access mechanisms and protocols, data mechanisms and protocols, QoS mechanisms and protocols, and other mechanisms and protocols. The rules and policies also include characteristics and feature sets with respect to the IoT data including for example IoT data type, traffic flow direction, security level, frequency of IoT data, size of IoT data, sensitivity of the IoT network device, sensitivity of data, and other characteristics and features. In implementations, the characteristics and features of IoT data can differ based on a direction of traffic flow, security level, and other characteristics and features.

The distributed security mechanisms and protocols and authentication mechanisms and protocols enable each of the devices 4200, the access network devices 4300, the core network devices 4400, and the application servers 4500 to establish a security association and mutual trust with an interfacing IoT network device (a chain of custody), which can be with any of the devices 4200, the access network devices 4300, the core network devices 4400, and the application servers 4500 (4700). That is, any pair of IoT network devices in the network can establish a secure association and exchange information securely across the established secure association. For example, the devices 4200 can establish a secure association with the access network devices 4300 (4710), the access network devices 4300 can establish a secure association with the core network devices 4400 (4720), and the core network devices 4400 can establish a secure association with the application servers 4500 (4730). The IoT data can then be end-to-end securely transferred, transmitted, or exchanged between each of the IoT network devices, with the established chain of custody, in accordance with the rules and policies associated with the IoT data (4800). In implementations, the IoT data can use ciphering, encryption, integrity checking, and other techniques to secure the IoT data. As described herein, the rules and policies are updated and enforced on a continuous and automatic manner.

Figure 5:
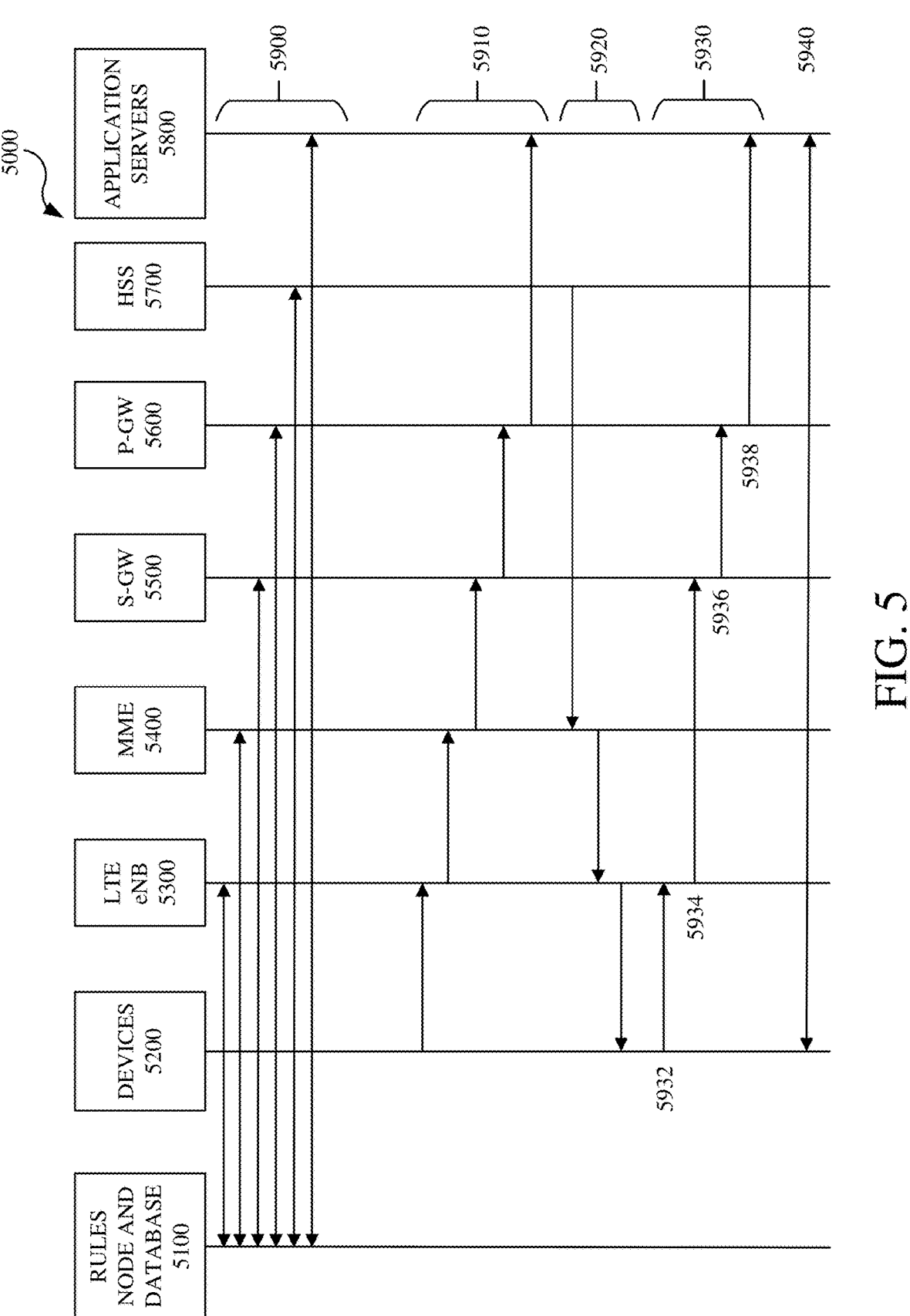
FIG. 5 is a diagram of an example flow sequence for IoT network security in accordance with embodiments of this disclosure.

FIG. 5 is a diagram of an example flow sequence 5000 for IoT network security with respect to a LTE network in accordance with embodiments of this disclosure. The flow sequence 4000 can be implemented using, for example, a rules node and database 5100, devices 5200 which can include IoT devices, a LTE e-NodeB (eNB) 5300, a Mobility Management Entity (MME) 5400, a serving gateway (S-GW) 5500, a Packet Data Network Gateway (P-GW) 5600, a Home Subscriber Server (HSS) 5700, and application servers 5800. The rules node and database 5100 distributes rules and policies to the LTE eNB 5300, the MME 5400, the S-GW 5500, the P-GW 5600, the HSS 5700, and the application servers 5800 and enforces the same to establish a chain of custody between the IoT network devices and end-to-end secure IoT data transmission between the devices 5200 and the application servers 5800 (5900). The rules and policies can include, but is not limited to, minimum viable resource allocation, security mechanisms and protocols, communication mechanisms and protocols, authentication mechanisms and protocols including authentication keys, access mechanisms and protocols, data mechanisms and protocols, and other mechanisms and protocols, QoS mechanisms and protocols, and other mechanisms and protocols. The rules and policies also include characteristics and feature sets with respect to the IoT data including for example IoT data type, traffic flow direction, security level, frequency of IoT data, size of IoT data, sensitivity of the IoT network device, sensitivity of data, and other characteristics and features. In implementations, the characteristics and features of IoT data can differ based on a direction of traffic flow, security level, and other characteristics and features.

In the flow sequence 5000, the devices 5200 attach to the LTE network via the LTE eNB 5300, the MME 5400, the S-GW 5500, the P-GW 5600, and the application servers 5800 (5910). The rules node and database 5100 does not have direct communication with the devices 5200. Consequently, the HSS 5700 transfers the rules and policies to the devices 5200 via the MME 5400 and the eNB 5300 (5920).

The distributed security mechanisms and protocols and authentication mechanisms and protocols enable the devices 5200, the LTE eNB 5300, the S-GW 5500, the P-GW 5600, and the application servers 5800 to establish a security association and mutual trust with an interfacing IoT network device (a chain of custody), which can be with any of the devices 5200, the LTE eNB 5300, the S-GW 5500, the P-GW 5600, and the application servers 5800 (5930). That is, any pair of IoT network devices in the LTE network can establish a secure association and exchange information securely across the established secure association. For example, the devices 5200 can establish a secure association with the LTE eNB 5300 (5932), the LTE eNB 5300 can establish a secure association with the S-GW 5500 (5934), the S-GW 5500 can establish a secure association with the P-GW 5600 (5936), and the P-GW 5600 can establish a secure association with the application servers 5800 (5938). The IoT data can then be end-to-end securely transferred, transmitted, or exchanged between each of the IoT network devices, with the established chain of custody, in accordance with the rules and policies associated with the IoT data (5940). In implementations, the IoT data can use ciphering, encryption, integrity checking, and other techniques to secure the IoT data. In implementations, end-to-end security and chain of custody can be established in an uplink direction and in a downlink direction. In implementations, the end-to-end security and chain of custody can be different for the uplink direction and the downlink direction. As described herein, the rules and policies are updated and enforced on a continuous and automatic manner.

Figure 6:
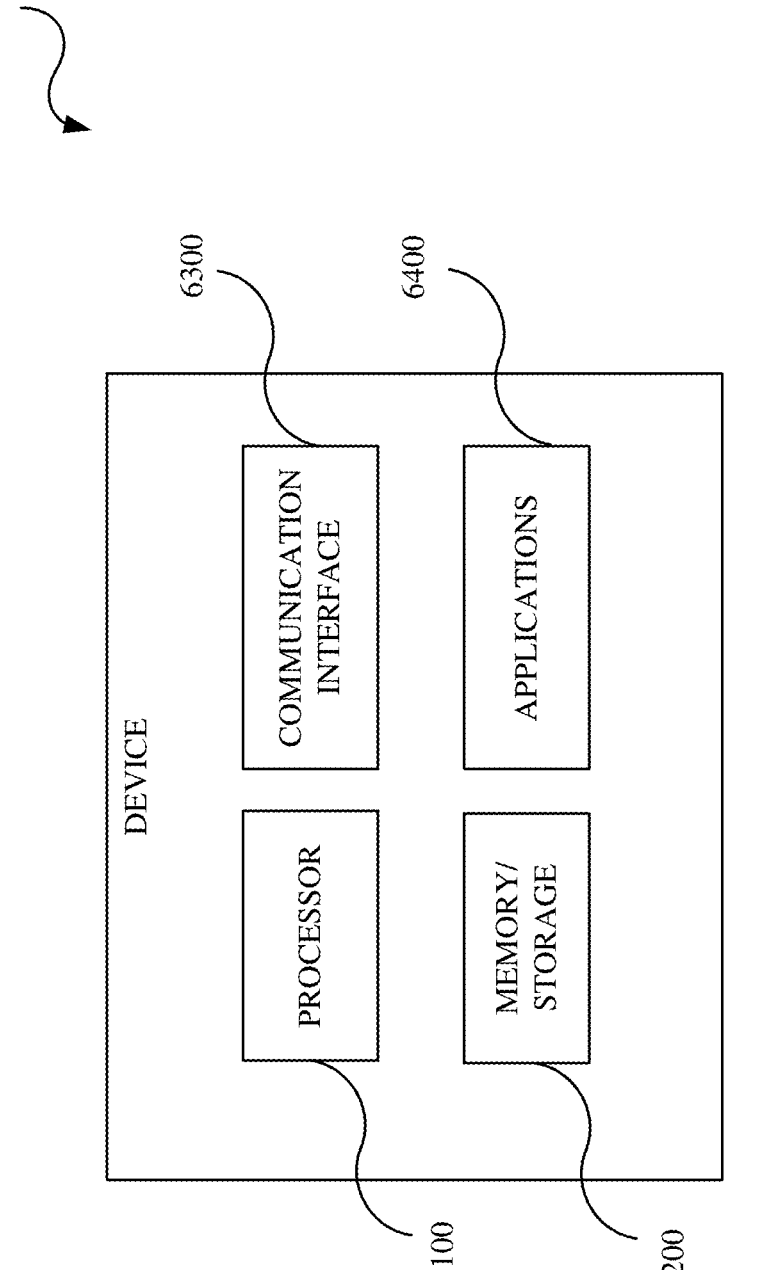
FIG. 6 is a block diagram of an example of a device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, and applications 6400. The device 6000 may include or implement, for example, the IoT devices IoT$_1$, IoT$_2$, . . . , IoT$_N$ 1100, the network device 1200, the IoT$_1$, IoT$_2$, . . . , IoT$_m$ 1300, the network device 1400, the gateway 1500, the gateway 1600, the AS$_1$, AS$_2$, . . . , AS$_K$ 1700, the rules system (RS) 1800, the RN 1810, the RD 1820, the rules node 2000, the controller 2100, devices in the IoT device segment 3100, the access network segment 3200, the core network segment 3300, and the application segment 3400, the rules node and database 4100, the devices 4200, the access network devices 4300, the core network devices 4400, the application servers 4500, the rules node and database 5100, the devices 5200, the LTE eNB 5300, the MME 5400, the S-GW 5500, the P-GW 5600, the HSS 5700, and the application servers 5800. In an implementation, appropriate memory/storage 6200 may store the connect code 2300, the monitoring code 2400, the data gathering code 2500, the analysis code 2600, the compliance code 2700, the rules implementation code 2800, rules, policies, and the like. In an implementation, appropriate memory/storage 6200 is encoded with instructions for at least connectivity, monitoring, gathering, analysis, and compliance. The IoT network security techniques or methods described herein may be stored in appropriate memory/storage 6200 and executed by the appropriate processor 6100 in cooperation with the memory/storage 6200, the communications interface 6300, and applications 6400, as appropriate. The device 6000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

FIG. 7 is a flowchart of an example method 7000 for IoT network security in accordance with embodiments of this disclosure. The method 7000 includes: collecting 7050 profile information for each IoT network device; determining 7100 a minimum viable resource allocation for each IoT network device based on portions of the profile information collected for the IoT network device; distributing 7150 appropriate minimum viable resource allocations and a set of rules to each IoT network device; determining 7200 a monitoring character set based on the profile information; monitoring 7250 each IoT network device using the monitoring character set; collecting 7300 updated profile information based in part on the monitoring character set; analyzing 7350 the updated profile information to determine trends and insights; updating 7400 the monitoring character set, the minimum viable resource allocation, and the set of rules based on the analyzed updated profile information for each of the IoT network devices; checking 7450 compliance of each IoT network device with a current minimum viable resource allocation and set of rules; identifying 7500 IoT network devices having violations and under threat based on checking compliance of the IoT network devices; and performing 7550 the monitoring, collecting, analyzing, updating, checking, and identifying on a continuous and automatic basis. For example, the method 7000 may be implemented, as applicable and appropriate, by the IoT devices IoT$_1$, IoT$_2$, . . . , IoT$_N$ 1100, the network device 1200, the IoT$_1$, IoT$_2$, . . . , IoT$_M$ 1300, the network device 1400, the gateway 1500, the gateway 1600, the AS$_1$, AS$_2$, . . . , AS$_K$ 1700, the rules system (RS) 1800, the RN 1810, the RD 1820, the rules node 2000, the controller 2100, devices in the IoT device segment 3100, the access network segment 3200, the core network segment 3300, and the application segment 3400, the rules node and database 4100, the devices 4200, the access network devices 4300, the core network devices 4400, the application servers 4500, the rules node and database 5100, the devices 5200, the LTE eNB 5300, the MME 5400, the S-GW 5500, the P-GW 5600, the HSS 5700, and the application servers 5800.

The method 7000 includes collecting 7050 profile information for each IoT network device. A rules system, including a rules node and rules database, collects profile information from each IoT network device that is connected or comprises an IoT network. The profile information can include, but is not limited to, The profile information for the IoT network device can include, but is not limited to, the information described herein to determine the minimum viable resource allocation, whether the IoT network device is an IoT device, edge device, core device, or access device, and like information. The profile information is saved in the rules database.

The method 7000 includes determining 7100 a minimum viable resource allocation for each IoT network device based on portions of the profile information collected for the IoT network device. The rules node determines the minimum viable resource allocation based on connectivity, bandwidth, amount of transmitted data, frequency of transmission, authorization to connect, and access to data requirements for the IoT network device. The minimum viable resource allocation for each IoT network device is saved in the rules database. The rules node also determines a set of rules for each IoT network device based on the profile information. The set of rules includes, but is not limited to, security rules, transmission rules, access rules, authorization rules, security authorization protocols, transmission protocols, communication protocols, and security protocols, and the like.

The method 7000 includes distributing 7150 appropriate minimum viable resource allocations and a set of rules to each IoT network device. The rules system distributes to each IoT network device the minimum viable resource allocations and the sets of rules appropriate to implement IoT network security. For example, IoT network devices at an interface can need the minimum viable resource allocation and set of rules for IoT devices transmitting IoT data and the minimum viable resource allocation and set of rules for all IoT network devices at the interface.

The method 7000 includes determining 7200 a monitoring character set based on the profile information. The rules system implements IoT network security by monitoring, collecting, analyzing, and enforcing or checking compliance of each IoT network device. This can be done by generating a monitoring character or feature set for each IoT network device that is representative of the IoT network device. This monitoring character or feature set is generated from the profile information.

The method 7000 includes monitoring 7250 each IoT network device using the monitoring character set and collecting 7300 updated profile information based in part on the monitoring character set. The rules system collects snapshots and stores the information in the rules database to have temporal or historical profile information datasets. In implementations, this can be done at defined intervals, on a periodic basis, event based, combinations thereof, and the like.

The method 7000 includes analyzing 7350 the updated profile information to determine trends and insights and updating 7400 the monitoring character set, the minimum viable resource allocation, and the set of rules based on the analyzed updated profile information. The rules node analyzes the historical profile information datasets to determine trends, insights, IoT network states, IoT network additions and deletions, IoT network traffic flow, violations, security threats, and the like. Updates to the monitoring character set, the minimum viable resource allocation, and the set of rules can be generated based on the analyzed historical profile information datasets. Implementation of the updates can be implemented in IoT network security models to evaluate consistency of updates, effects of changes in IoT network security, and the like prior to updating any IoT network devices.

The method 7000 includes checking 7450 compliance of each IoT network device with a current minimum viable resource allocation and set of rules and identifying 7500 IoT network devices having violations and under threat based on checking compliance of the IoT network devices. The rules system enforces the minimum viable resource allocation and set of rules with respect to IoT network devices. Configuration changes can be sent to IoT network devices based on compliance issues.

The method 7000 includes performing 7550 the monitoring, collecting, analyzing, updating, checking, and identifying (IoT network security lifecycle) on a continuous and automatic basis. Stale and old minimum viable resource allocations and sets of rules can be kept fresh by performing the IoT network security lifecycle on a defined intervals, on a periodic basis, event based, combinations thereof, and the like.

FIG. 8 is a flowchart of an example method 8000 for IoT data transfer in an IoT network in accordance with embodiments of this disclosure. The method 8000 includes: providing 8100 IoT network security in accordance with the method described in FIG. 7; dividing 8200 the IoT network into IoT network segments with associated IoT network devices; establishing 8300 security associations and mutual trusts between IoT network devices which are at interfaces between two IoT network segments; exchanging 8400 the IoT data using the distributed set of rules and the minimum viable resource allocations upon successful security association and compliance; and identifying 8500 at least one of IoT network devices or IoT data having violations and under threat based on unsuccessful compliance. For example, the method 8000 may be implemented, as applicable and appropriate, by the IoT devices IoT$_1$, IoT$_2$, . . . , IoT$_N$ 1100, the network device 1200, the IoT$_1$, IoT$_2$, . . . , IoT$_M$ 1300, the network device 1400, the gateway 1500, the gateway 1600, the AS$_1$, AS$_2$, . . . , AS$_K$ 1700, the rules system (RS) 1800, the RN 1810, the RD 1820, the rules node 2000, the controller 2100, devices in the IoT device segment 3100, the access network segment 3200, the core network segment 3300, and the application segment 3400, the rules node and database 4100, the devices 4200, the access network devices 4300, the core network devices 4400, the application servers 4500, the rules node and database 5100, the devices 5200, the LTE eNB 5300, the MME 5400, the S-GW 5500, the P-GW 5600, the HSS 5700, and the application servers 5800.

The method 8000 includes providing 8100 IoT network security in accordance with the method described in FIG. 7. A rules system distributes appropriate and applicable minimum viable resource allocation and sets of rules to IoT network devices. For example, the sets of rules include security mechanisms and protocols, communication mechanisms and protocols, authentication mechanisms and protocols including authentication keys, access mechanisms and protocols, data mechanisms and protocols, characteristics and feature sets with respect to the IoT data including for example IoT data type, traffic flow direction, security level, frequency of IoT data, size of IoT data, and other rules, protocols, characteristics, and features as appropriate.

The method 8000 includes dividing 8200 the IoT network into IoT network segments with associated IoT network devices. The IoT network includes a multiplicity of data exchanges to transfer data from an IoT device to an application server. Each of these data exchanges use different protocols for security, communication, data transfer, authentication, access, and the like. IoT network security is enhanced and optimized by being able to check compliance at each IoT network device as described in FIG. 7 and by checking compliance when traversing between the different protocols for security, communication, data transfer, authentication, access, and the like. This can be done by establishing IoT network segments and checking compliance at interfaces between the IoT network segments and establishing a chain of custody between the IoT network segments.

The method 8000 includes establishing 8300 security associations and mutual trusts between IoT network devices which are at interfaces between two IoT network segments. Any pair of IoT network devices can establish a security association and mutual trust by using the distributed set of rules to invoke challenges and compare answers. This establishes an end-to-end secure transmission of IoT data and a chain of custody between IoT network segments.

The method 8000 includes exchanging 8400 the IoT data using the distributed set of rules and the minimum viable resource allocations upon successful security association and compliance. The IoT data can be exchanged using the distributed set of rules.

The method 8000 includes identifying 8500 at least one of IoT network devices or IoT data having violations and under threat based on at least one of unsuccessful security association or compliance. The rules system and each appropriate and applicable IoT network device enforces the minimum viable resource allocation and set of rules with respect to IoT network devices, IoT network segment interfaces, and IoT data. Configuration changes can be sent to IoT network devices based on security association and compliance issues.

In general, a method for Internet of Things (IoT) network security includes collecting, by a rules node, profile information for each IoT network device in or comprising an IoT network, determining, by the rules node, a minimum viable resource allocation for each IoT network device based on portions of the collected profile information, wherein the minimum viable resource allocation defines for each IoT network device minimum resources needed to engage the IoT network and handle IoT data collected by IoT devices on the IoT network, distributing, by the rules node, an appropriate minimum viable resource allocation and a set of rules to each IoT network device, determining, by the rules node, a monitoring character set based on the collected profile information, monitoring, by the rules node, each IoT network device using the monitoring character set, collecting, by the rules node, updated profile information based in part on the monitoring character set, analyzing, by the rules node, the updated profile information to determine at least trends and insights with respect to the IoT network devices and the IoT network, updating, by the rules node, each monitoring character set, each minimum viable resource allocation, and each set of rules based on the analyzed updated profile information for each of the IoT network devices, checking, by the rules node, compliance of each IoT network device with a current minimum viable resource allocation and current set of rules for the IoT network device, identifying, by the rules node, IoT network devices having violations and under threat based on checking compliance of the IoT network devices, and performing, by the rules node, the monitoring, the collecting of the updated profile information, the analyzing, the updating, the checking, and the identifying on a continuous and automatic basis. In implementations, the profile information for each IoT network device includes at least connectivity, bandwidth, amount of transmitted data, frequency of transmission, authorization to connect to other IoT network devices and network functions, level of and access to data by the IoT network device, timing parameters related to the IoT network device, location parameters related to the IoT network device, IoT network device type, security protocols, transmission protocols, access protocols, authorization protocols, security authorization protocols, transmission protocols, communication protocols, and security protocols. In implementations, the portions of the collected profile information for determining the minimum viable resource allocation include at least the connectivity, the bandwidth, the amount of transmitted data, the frequency of transmission, the authorization to connect to other IoT network devices and network functions, the level of and access to data by the IoT network device, the time when access to IoT data is permitted for the IoT network device, and the location where access to IoT data is permitted by the IoT network device. In implementations, the IoT network device type includes at least IoT devices, network edge devices, network access devices, network core devices, and application devices or servers. In implementations, the set of rules is based on the profile information, the set of rules including at least security rules, transmission rules, access rules, authorization rules, security authorization rules, transmission rules, communication rules, and security rules. In implementations, the method further includes configuring, by the rules node, the identified IoT network devices based on non-compliance with the current minimum viable resource allocation and the current set of rules. In implementations, the method further includes dividing, the rules node, the IoT network into IoT network segments including a source IoT network segment and a destination IoT network segment, each IoT network segment having associated IoT network devices, establishing, by applicable associated IoT network devices using applicable sets of rules, security associations and mutual trust with other associated IoT network devices which are at interfaces between two IoT network segments, wherein successful security associations and mutual trust establishment provide end-to-end security between the source IoT network segment and the destination IoT network segment, exchanging, between each pair of associated IoT network segments at interfaces, the IoT data using applicable sets of rules and applicable minimum viable resource allocations upon successful security associations and compliance, wherein the compliance with the applicable sets of rules and applicable minimum viable resource allocations establish chains of custody between the each pair of associated IoT network segments, and identifying, by at least one of the rules node and one or more IoT network devices, at least one of IoT network devices or IoT data having violations based on at least one of unsuccessful security association and mutual trust or non-compliance with the applicable minimum viable resource allocations and the applicable sets of rules. In implementations, the set of rules further includes at least authentication rules, mechanisms and protocols including authentication keys, data rules, mechanisms and protocols, characteristics and features for the IoT data including IoT data type, traffic flow direction, security level, frequency of the IoT data, and size of the IoT data. In implementations, the method further includes checking, by at least one of the rules node and the each pair of IoT network devices at the interfaces, compliance of the other IoT network devices at the interfaces using current applicable minimum viable resource allocations and current applicable sets of rules to establish the chains of custody. In implementations, the IoT network segments further include at least an access network segment and a core network segment.

In general, a method for transferring Internet of Things (IoT) data in a network includes segmenting, by a network security processor, the network into functional slices including a source slice and a destination slice, each slice including devices, determining, by the network security processor, a minimum viable resource allocation for each device based on information gathered for each device, wherein the minimum viable resource allocation is a threshold for each device to use the network and process data collected by IoT devices on the network, allocating, by the network security processor, appropriate minimum viable resource allocations and a set of rules to each device, forming, by each pair of devices at interfaces between two slices, security associations and mutual trust between the each pair of devices, wherein end-to-end security is established upon successful security associations and mutual trust, transferring, between the each pair of devices, the data using appropriate sets of rules and appropriate minimum viable resource allocations upon successful security associations and device and data compliance, wherein the compliance with the appropriate minimum viable resource allocations and the appropriate sets of rules establish chains of custody between the each pair of devices at the interfaces, and identifying, by at least one of the rules node and one or more IoT network devices, at least one of IoT network devices or IoT data having violations based on at least one of unsuccessful security association and mutual trust or non-compliance with the appropriate minimum viable resource allocations and the appropriate sets of rules. In implementations, the information for each device includes at least connectivity, bandwidth, amount of transmitted data, frequency of transmission, authorization to connect to other devices and network functions, level of and access to data by the device, timing parameters related to the device, location parameters related to the device, device type, security protocols, transmission protocols, access protocols, authorization protocols, security authorization protocols, transmission protocols, communication protocols, and security protocols. In implementations, the set of rules is based on the information, the set of rules including at least security rules, transmission rules, access rules, authorization rules, security authorization rules, transmission rules, communication rules, and security rules. In implementations, the information for determining the minimum viable resource allocation includes at least the connectivity, the bandwidth, the amount of transmitted data, the frequency of transmission, the authorization to connect to other devices and network functions, the level of and access to data by the device, the time when access to data is permitted for the device, and the location where access to data is permitted by the device. In implementations, the method further includes tracking, by the network security processor, each device using one or more device features, evaluating, by the network security processor, updated information gathered from the tracking to determine variations with respect to the devices and the network, updating, by the network security processor, each one or more device features, each appropriate minimum viable resource allocation, and each appropriate set of rules based on the analyzed updated information for each of the devices, detecting, by the network security processor, devices in violation of a current appropriate minimum viable resource allocation and current appropriate set of rules for the device, and executing, by the network security processor, the tracking, the evaluating, the updating, and the detecting on an automatic basis.

In general, a network includes devices, a memory; and a processor in communication with the memory and the devices. The processor configured to segment the network into at least a source segment, an access segment, a core segment, and a destination segment, each of the source segment, the access segment, the core segment, and the destination segment including at least one device from the devices, generate a minimum viable resource allocation for each device based on information gathered for each device, wherein the minimum viable resource allocation is a threshold for each device to use the network and process data collected by Internet of Things (IoT) devices on the network, and allocate appropriate minimum viable resource allocations and a set of rules to each device, pairs of the devices at interfaces between successive pairs of the source segment, the access segment, the core segment, and the destination segment. The pairs of devices configured to form security associations and mutual trust between each pairs of devices, wherein end-to-end security is established upon successful security associations and mutual trust, and transfer between the pairs of devices the data using applicable sets of rules and applicable minimum viable resource allocations upon successful security associations and device and data compliance, wherein the compliance with the applicable minimum viable resource allocations and the applicable sets of rules establish chains of custody between the pairs of devices, and at least the processor and the pairs of the devices configured to identify at least one device or data having violations based on at least one of unsuccessful security association and mutual trust or non-compliance with the applicable minimum viable resource allocations and the applicable sets of rules. In implementations, the information for each device includes at least connectivity, bandwidth, amount of transmitted data, frequency of transmission, authorization to connect to other devices and network functions, level of and access to data by the device, timing parameters related to the device, location parameters related to the device, device type, security protocols, transmission protocols, access protocols, authorization protocols, security authorization protocols, transmission protocols, communication protocols, and security protocols. In implementations, the set of rules is based on the information, the set of rules including at least security rules, transmission rules, access rules, authorization rules, security authorization rules, transmission rules, communication rules, and security rules. In implementations, the information for generating the minimum viable resource allocation includes at least the connectivity, the bandwidth, the amount of transmitted data, the frequency of transmission, the authorization to connect to other devices and network functions, the level of and access to data by the device, the time when access to data is permitted for the device, and the location where access to data is permitted by the device. In implementations, the processor further configured to track each device using one or more device features, evaluate updated information gathered from the tracking to determine variations with respect to the devices and the network, update each one or more device features, each minimum viable resource allocation, and each set of rules based on the analyzed updated information for each of the devices, detect devices in violation of a current minimum viable resource allocation and current set of rules for the device, and execute tracking, evaluating, updating, and detecting on an automatic basis.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for network security, the method comprising:
   determining, by a rules node, a minimum viable resource allocation for each network device in or comprising a network, wherein the minimum viable resource allocation defines, for each network device, minimum resources needed to engage the network and to handle data collected by network devices on the network;
   updating, by the rules node, the minimum viable resource allocation for at least one network device based on updated information associated with each of the at least one network device and the network;
   detecting, by the rules node, one or more network devices having violations and under threat based on non-compliance of the one or more network devices with an applicable minimum viable resource allocation;
   configuring, by the rules node, the detected network devices based on non-compliance with the applicable minimum viable resource allocation;
establishing, by applicable associated network devices of the network devices using applicable sets of rules, security associations and mutual trust with other associated network devices of the network device;
   wherein compliance with the applicable sets of rules and the applicable minimum viable resource allocations establishes a chain of custody between the associated network devices, and
   wherein the chain of custody differs based on traffic flow direction by using different sets of rules and minimum viable resource allocations for different traffic flow directions between the associated network devices.

2. The method of claim 1, wherein the applicable sets of rules, security associations and mutual trust with other associated network devices of the network devices are at interfaces between two network segments in the network, and wherein successful establishment of the security associations and the mutual trust provide end-to-end security between the two network segments.

3. The method of claim 2, wherein the set of rules includes at least security rules, transmission rules, access rules, authorization rules, security authorization rules, communication rules, and security rules.

4. The method of claim 3, further comprising:
   checking, by at least one of the rules node and each pair of the network devices at the interfaces, compliance of other network devices at the interfaces using the applicable minimum viable resource allocations and the applicable sets of rules to establish the chains of custody.

5. The method of claim 4, further comprising:
   continuously monitoring, by the rules node, changes in information associated with each of the network device and the network.

6. The method of claim 1, wherein the minimum viable resource allocation for each of the network device is based on at least connectivity, bandwidth, amount of transmitted data, frequency of transmission, authorization to connect to other network devices and network functions, level of and access to data by the network device, time when access to data is permitted for the network device, and location where access to data is permitted by the network device.

7. The method of claim 6, wherein a type of the network device includes at least devices, network edge devices, network access devices, network core devices, and application devices or servers.

8. The method of claim 1, further comprising:

automatically and continuously performing minimum viable resource allocation determinations, compliance confirmations for each of the network device, and configuration of the network devices and of the network.

9. The method of claim 1, wherein insights of the network are determined by a machine learning model.

10. A network for transferring data, comprising:

functional network slices, each functional network slice including devices which have visibility and authorization limited to the functional network slice; and a network security processor configured to allocate a minimum viable resource allocation and a set of rules to each of the devices, wherein the minimum viable resource allocation is a threshold for each of the devices to use the network and process data collected by the devices on the network, wherein appropriate pairs of the devices form, between pairs of the functional network slices, security associations, minimum viable resource allocation confirmation, and mutual trust between the appropriate pairs of the devices, which provide end-to-end security between a source functional network slice and a destination functional network slice in the network upon successful establishment of the security associations and establishment of the mutual trust by all of the appropriate pairs of the devices, and wherein the appropriate pairs of the devices transfer data upon successful confirmation of the security associations and device and data compliance, the device and data compliance establishing a chain of custody between the appropriate pairs of the devices at each of the functional network slices, and wherein the chain of custody and the security associations and the mutual trust between the appropriate pairs of the devices differ based on traffic flow direction by using different sets of rules and minimum viable resource allocations for different traffic flow directions between the appropriate pairs of the devices.

11. The network of claim 10, the network security processor further configured to:

identify at least one device or data having violations based on at least one of unsuccessful security association and the mutual trust.

12. The network of claim 11, the network security processor further configured to:

correlate metrics in the network to detect and mitigate suspicious activity; and isolate the devices, applications, and functional network slices impacted by detected suspicious activity at a point of impact.

13. The network of claim 11, the network security processor further configured to:

detect the devices in violation of an appropriate minimum viable resource allocation and appropriate set of rules for the device; and

configure the identified devices based on non-compliance with the appropriate minimum viable resource allocations and the appropriate sets of rules.

14. The network of claim 10, wherein the chain of custody is an end-to-end chain of custody and includes at least establishment of the mutual trust, mutual authentication, and data security.

15. The network of claim 10, wherein the minimum viable resource allocation for the device is based on information gathered for the device.

16. The network of claim 15, wherein the information for each of the devices includes at least connectivity, bandwidth, amount of transmitted data, frequency of transmission, authorization to connect to other devices and network functions, level of and access to data by the device, timing parameters related to the device, location parameters related to the device, device type, security protocols, transmission protocols, access protocols, authorization protocols, security authorization protocols, transmission protocols, communication protocols, and security protocols.

17. The network of claim 15, wherein the set of rules is based on the information, the set of rules including at least security rules, transmission rules, access rules, authorization rules, security authorization rules, transmission rules, communication rules, and security rules.

18. A network comprising:

network devices;

a memory;

a processor in communication with the network devices, the processor configured to:

determine a minimum viable resource allocation for each of the network devices in or comprising a network, wherein the minimum viable resource allocation defines, for each of the network devices, minimum resources needed to engage the network and to handle data collected by network devices on the network;

update the minimum viable resource allocation for at least one of the network devices based on updated information associated with each of the at least one network devices and the network;

detect one or more network devices having violations and under threat based on non-compliance of the one or more network devices with an applicable minimum viable resource allocation;

configure the detected network devices based on non-compliance with the applicable minimum viable resource allocation;

establish, by applicable associated network devices of the network devices using applicable sets of rules, security associations and mutual trust with other associated network devices of the network devices;

wherein a compliance with the applicable sets of rules and the applicable minimum viable resource allocations establishes a chain of custody between the associated network devices, and wherein the chain of custody differs based on traffic flow direction by using different sets of rules and minimum viable resource allocations for different traffic flow directions between an appropriate pairs of the devices.

* * * * *